United States Patent
Madani

(10) Patent No.: US 8,239,337 B2
(45) Date of Patent: Aug. 7, 2012

(54) NETWORK DEVICE PROXIMITY DATA IMPORT BASED ON WEIGHTING FACTOR

(75) Inventor: Habib Madani, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 528 days.

(21) Appl. No.: 12/475,485

(22) Filed: May 30, 2009

(65) Prior Publication Data

US 2010/0306162 A1     Dec. 2, 2010

(51) Int. Cl.
*G06F 17/00* (2006.01)
*G06F 15/16* (2006.01)

(52) U.S. Cl. .......................................... 706/45; 709/245

(58) Field of Classification Search ........................ None
See application file for complete search history.

(56) References Cited

U.S. PATENT DOCUMENTS

2003/0074471 A1 *   4/2003   Anderson et al. ............. 709/245

* cited by examiner

*Primary Examiner* — Alan Chen
(74) *Attorney, Agent, or Firm* — Hickman Palermo Truong Becker Bingham Wong LLP

(57) ABSTRACT

Systems, methods, and other embodiments associated with importing proximity data are provided. Device identification information and device location information associated with a device are received from a data source. An estimated proximity of the device to one or more network zones is determined based at least in part on the device location information. A device identifier and the estimated proximity of the device are stored in a proximity database that stores proximity data for devices relative to one or more network zones.

15 Claims, 5 Drawing Sheets

NETWORK DEVICE PROXIMITY DATA IMPORT BASED ON WEIGHTING FACTOR

BACKGROUND

In a large-scale network widely dispersed clients are configured to access many servers. Often, multiple servers are capable of providing the same service, such as access to a popular website, to a client anywhere on the network. Site selection devices are used to direct a client requesting content to a server that can provide the requested content in an expeditious manner. The site selection devices employ load balancing techniques to determine, at any given time, which of the multiple servers is likely to be best able to provide requested content. One factor that is typically considered during load balancing is the proximity of a given server to the client requesting the content. In a load balancing context, proximity refers to the distance or delay between a client and server in terms of network topology rather than a strictly geographic distance. Of course, geographic proximity is typically a contributor to network topology proximity.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

BRIEF OVERVIEW

In computer networking, load balancing is used to select which of multiple content providers is to be connected to a client requesting content. The content providers are typically distributed among two or more network zones, which are typically divided in terms of the geographic location of the devices that are part of the network zone. The proximity of the available content providers to the requesting client often plays a role in the selection of the content provider. Load balancing algorithms typically consider proximity along with other factors like the content providers' current level of loading, the content providers' relative capabilities, and/or recent response times of the content providers in selecting a content provider to respond to a client request.

Site selectors are devices or routines that route client requests to a selected content provider. To determine proximity between the client and the various content providers, the site selector accesses a proximity database that stores proximity information such as a round-trip time, measured between the client's device proxy and each network zone. If the proximity database does not store proximity information for the client's device proxy, the site selector sends a probe to a proximity probing agent in each network zone to get proximity information between the proximity probing agents and the new device proxy. The learned proximity information is stored in the proximity database for later use. Due to the degradation in response time caused by the probing process, it is preferable to have proximity information for as many device proxies as possible stored in the proximity database.

A significant amount of location data for device proxies throughout the world are available from various proximity data gathering services. However, the location data available from these services cannot be readily imported into a proximity database. Thus, this resource of location data is not leveraged to augment proximity data in the proximity database, which could enhance response time of the network.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Figure 1:
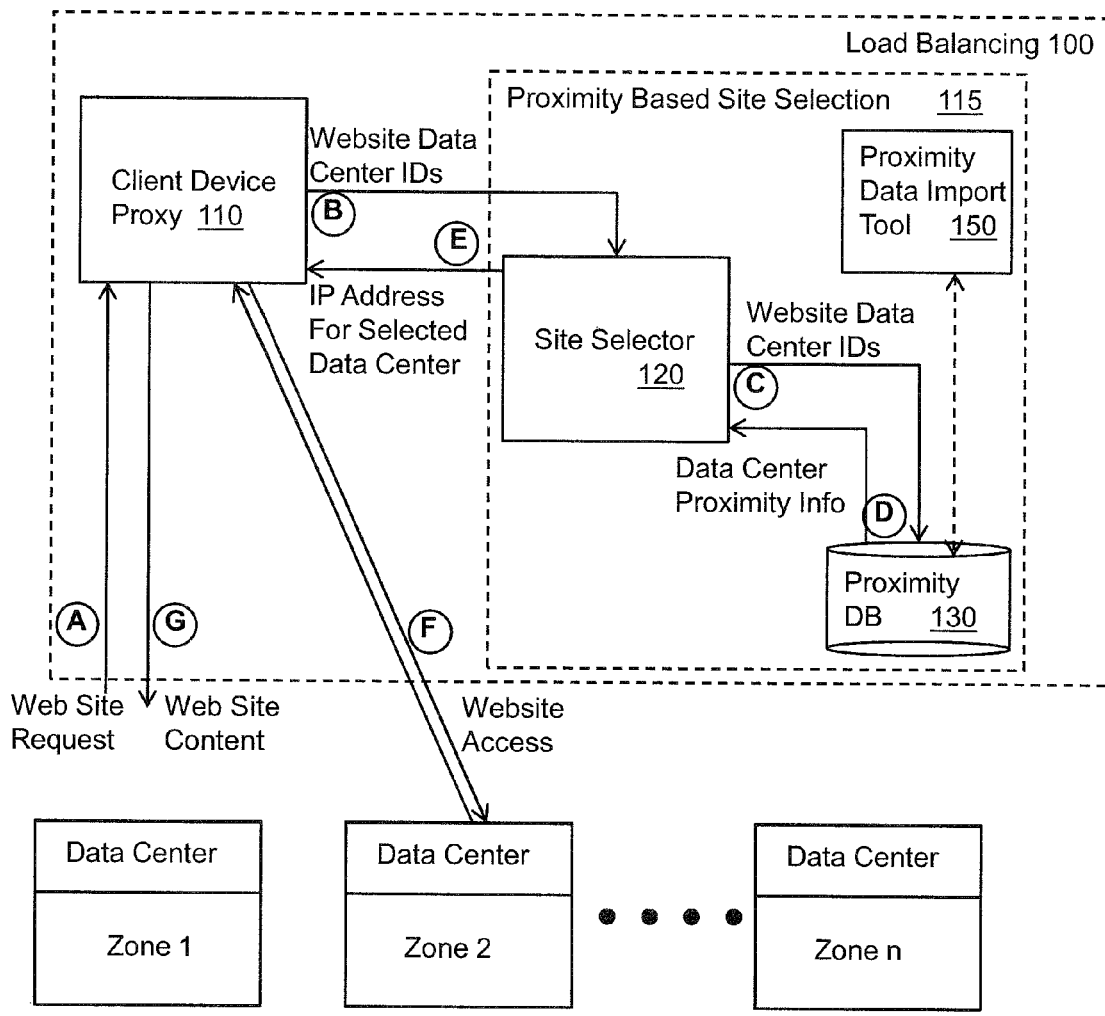
FIG. 1 illustrates a functional block diagram of an example proximity load balancing system.

FIG. 1 is a functional block diagram of an exemplary load balancing system 100 that includes a proximity based site selection system 115. For simplicity other systems that may participate in load balancing, such as load level and performance status monitoring systems are not shown. The load balancing system 100 services a network that includes data centers located in several zones 1-$n$. The proximity based site selection system 115 includes a site selector 120 that accesses a proximity database 130 to identify the data center that is most proximate to a client requesting content. The site selector 120 connects the client name server or device proxy 110 to the identified data center as follows.

At A, a request is made for access to a website whose content is supported at data centers in zones 1-$n$. The request is routed to the client device proxy 110. At B, the device proxy 110 supplies the identity of zones having data centers that support the website to the site selector 120. The site selector 120 accesses the proximity database 130 at C to determine proximity information for the data centers that support the website. At D, proximity information retrieved from the proximity database 130 is returned to the site selector 120. In many instances, the proximity information is in the form of round-trip times between the device proxy and the various network zones.

The site selector selects the data center in the most proximate zone, such as the zone that has the shortest round-trip time, and provides the address of the data center to the device proxy 110 at E. At F, the device proxy 110 uses the address to access the website at the selected data center, Zone 2 data center in the example shown in FIG. 1, and to retrieve the requested content. At G the requested content is provided to the client.

The proximity based site selection system 115 includes a proximity data import tool 150 that imports proximity data from external sources into the proximity database to augment proximity data that may have been acquired by way of the probing process described above. The proximity data import tool 150 is shown as being part of the proximity based site selection system 115 in FIG. 1. However, the proximity data import tool does not need to be dedicated to a single network or site selector. For example, the proximity data import tool may be an importable entity that is accessed, for example on the Internet when third party location data is to be stored as proximity data in a proximity database.

Figure 2:
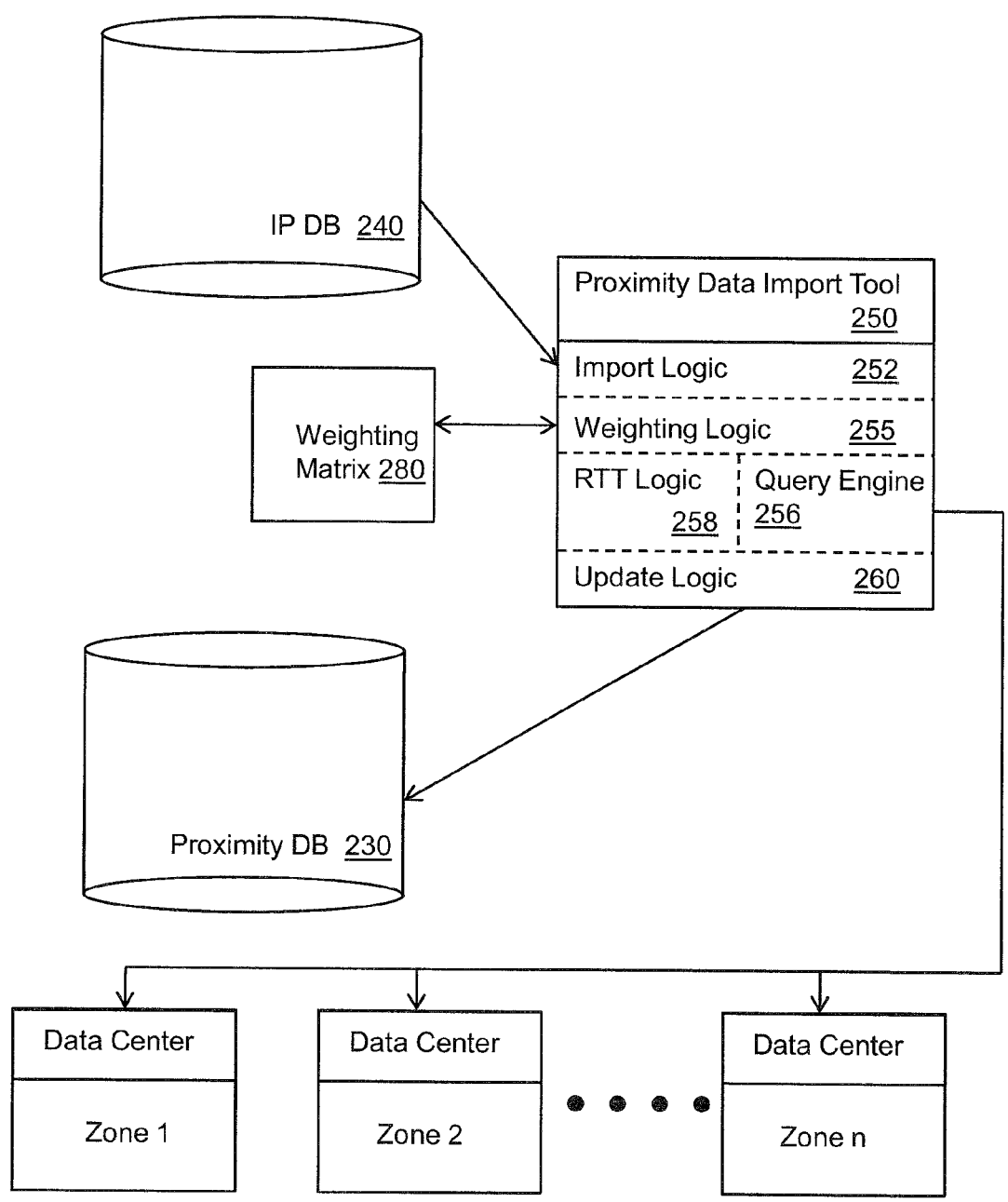
FIG. 2 illustrates a functional block diagram of an example proximity data import tool.

FIG. 2 illustrates one example proximity data import tool 250 that imports location data from an external location data source, such as an IP database 240 that stores IP addresses and locations for network devices. The proximity data import tool 250 then stores corresponding proximity data in a proximity database 230. The location data in these data sources may have been collected, for example, during Internet marketing or security screening. The proximity data import tool 250 transforms the location data from the IP database 240 into proximity data relative to network zones 1-$n$ that make up the network served by the proximity database 230. The proximity data import tool then stores the proximity data in the proximity database 230. In some instances, the proximity data import tool 250 stores the proximity data in the proximity database 230 such that the proximity data does not stale away, but remains in the proximity database until it is manually deleted.

The proximity data import tool 250 includes an import logic 252, a weighting logic 255, and an update logic 260. The import logic 252 receives device identification information and device location information associated with a device from the IP database 240. The weighting logic 255 determines an estimated proximity of the device to the one or more network zones 1-$n$ in the network. The estimated proximity is determined based at least in part on the device location information and a location, such as a geographic location, of the one or more network zones. The update logic 260 stores the device identification information and the determined estimated proximity with respect to the one or more network zones in the proximity database 230.

The import logic depicted in FIG. 2 is configured to parse an IP database entry for a given device to extract a device address and a country code as the device identification information and the device location information, respectively.

The weighting logic 255 depicted in FIG. 2 accesses a weighting matrix 280 that maps a weighting factor to a combination of a network zone location and a device location. The weighting logic 255 determines a location for the network zones 1-$n$. The weighting logic 255 then accesses the weighting matrix 280 to select a weighting factor based on the determined location of the network zones and the device location. For example, for device location information that indicates that a device is located in Canada, and a network zone located in Japan, the weighting matrix may specify a weight of 3 in a scale of 1-7 with 1 corresponding to a device and a zone in the same location and 7 indicating the most remote proximity. A default weighting matrix may be provided with the proximity data import tool 250 that is based on geographic distances between the locations represented on the weighting matrix. In addition, the weighting matrix may be customizable such that the weights may be adapted based on, for example, actual experience with the various device and zone locations. The weighting matrix 280 may also be expandable to provide support for network growth into new locations.

The weighting logic 255 may determine a location for the network zones 1-$n$. In this case, the weighting logic 255 accesses the weighting matrix to select weights based at least in part on network zone location and device location information. In this manner, the weighting logic 255 may provide an estimated proximity for the device with respect to network zones 1-$n$ in the network.

The weighting logic 252 may include a query engine 256 that is used to determine a location, such as the geographic location, of network zones, that are divided in terms of network topology. The query engine 256 queries a Direct Response Protocol Agent (not shown) for the network zones 1-$n$ to return a location for the Direct Response Protocol Agent. The returned location, such as a country code or region, corresponds to the location of the network zone in which the Direct Response Protocol is located.

The weighting logic 252 may determine an estimated proximity in terms of a round-trip time between the network zones and the device. In this case, the weighting logic 252 includes a round-trip time logic that calculates an estimated round-trip time for the device with respect to the one or more network zones. The estimated round-trip time is based at least in part on the device location information and a location of the network zones.

The update logic 260 formats the estimated proximity or proximities for storage in the proximity database. The update logic may format the entry to include an IP address of the device and one or more estimated proximities in an order that corresponds to a conventional order for the network zones.

"Logic", as used herein with respect to apparatus, includes but is not limited to hardware, firmware, a method encoded on a tangible medium, and/or combinations thereof to perform a function(s) or an action(s), and/or to cause a function or action from another logic, method, and/or system. Logic may be encoded in one or more tangible media that stores computer executable instructions that if executed by a machine (e.g., ASIC) cause the machine to perform the encoded method. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combination of gates, other circuit components, and so on. Where multiple logical units are described, it may be possible in some examples to incorporate the multiple logical units into one physical logic. Similarly, where a single logical logic is described, it may be possible in some examples to distribute that single logical logic between multiple physical units.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Figure 3:
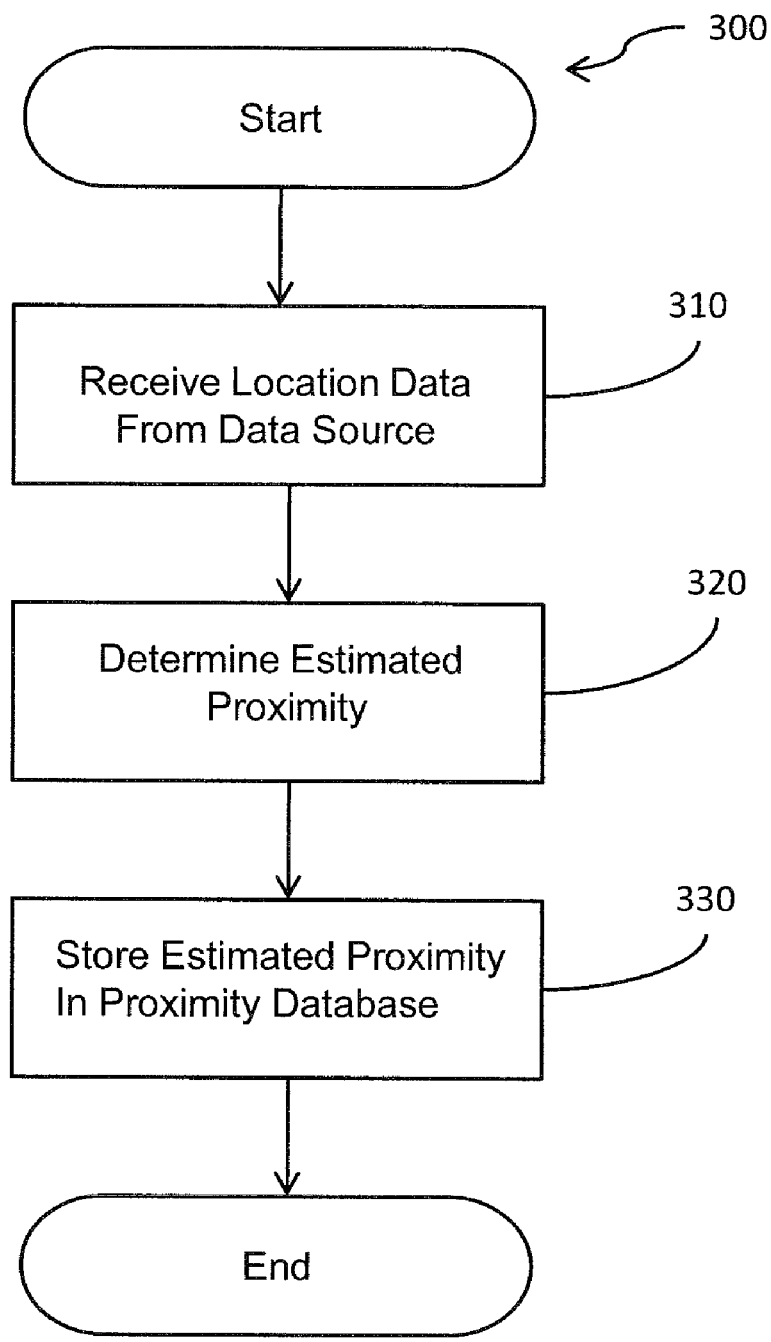
FIG. 3 illustrates an example method associated with importing location data to update proximity data.

FIG. 3 is a flow diagram that illustrates an exemplary proximity data import method 300. The proximity data import method 300 includes, at 310, receiving device identification information and device location information associated with a device from a data source. At 320, an estimated proximity of the device to one or more network zones is determined based at least in part on the device location information. At 330, a device identifier associated with the device and the estimated proximity of the device is stored in a proximity database that stores proximity data for devices relative to one or more network zones. In this manner, the proximity data import method transforms location information about a device into proximity data with respect to network zones in a particular network for storage in a proximity database that serves the network.

Figure 4:
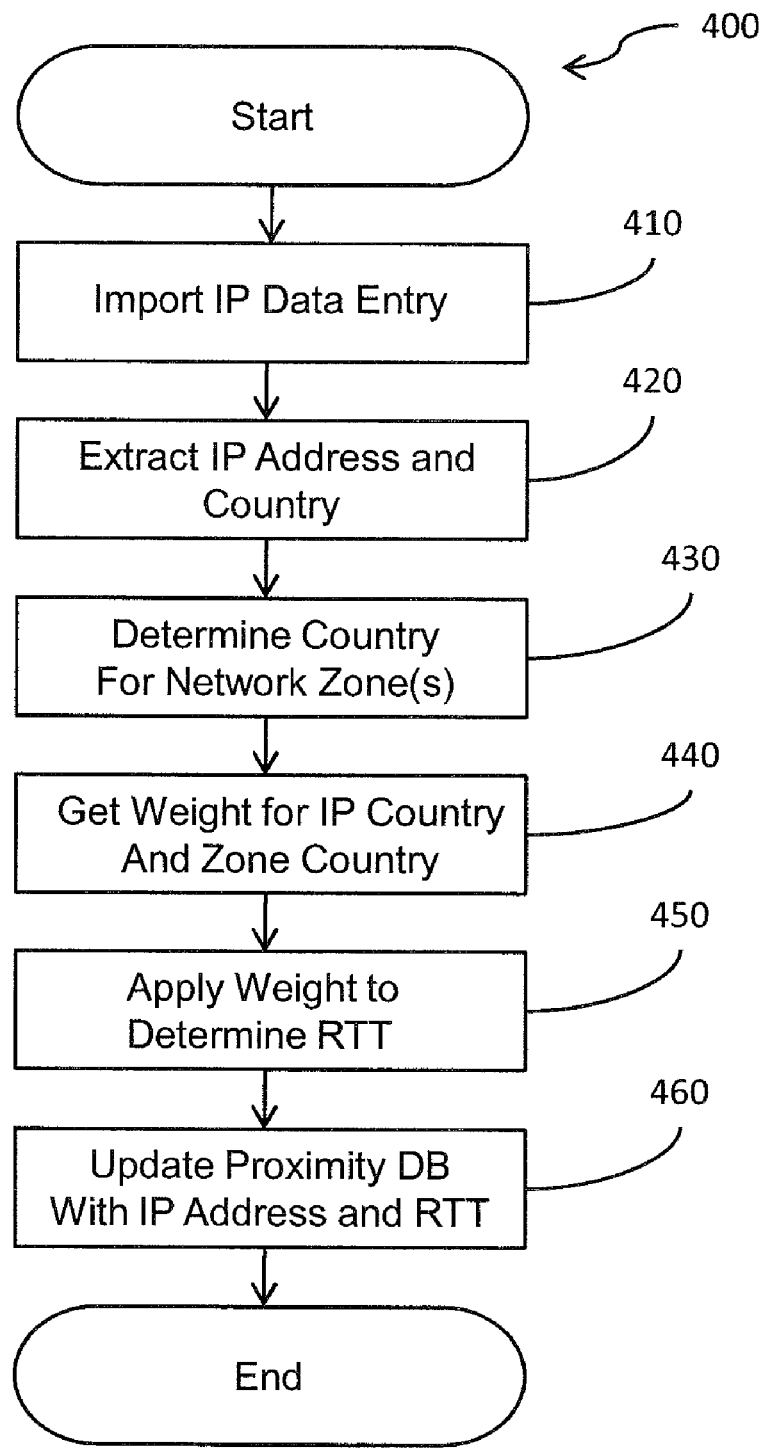
FIG. 4 illustrates an example method associated with importing Internet Protocol (IP) data to update proximity data.

FIG. 4 is a flow diagram that illustrates a particular proximity data import method 400. At 410, an entry in an IP database that stores proximity information is imported. At 420, the entry is parsed to extract an IP address and country information for a device. A zone geographic location of at least one of the one or more network zones is determined at 430. The method 400 may also include discovering the zones that make up a particular network by querying a network zone matrix to return a list of network zones. In this manner, the method 400 does not need to have a priori knowledge of the way in which a particular network is divided into zones. The zone geographic location of the returned network zones may be obtained by querying a Direct Response Protocol Agent for the one or more network zones to return a location for the Direct Response Protocol Agent for the one or more zones. Thus, the method 400 may query components of the various network zones to discover the location of the zone, such as the country or region in which the zone is located.

At 440, a weight is selected from a weighting matrix that maps a weight to a combination of device geographic location and zone geographic location. The selected weight is used in the determination an estimated proximity. The value of the weight for any given combination of device geographic location and zone geographic location may be assigned based on a geographic distance between the device and zone locations. In addition, the value of the weight may be influenced by other factors such as previous experience in transmitting data between the various locations or the capability of transmission equipment that is present in the locations.

At 450, the estimated proximity is determined by applying the weight to a default round-trip time between the device geographic location and the zone geographic location. A default round-trip time of 100 milliseconds may be used in some applications. For example, for a device in Canada and a network zone in Japan, a weight of 3 may be selected. In this case, the selected weight of 3 will result in an estimated proximity of 300 milliseconds for the device with respect to the network zone located in Japan. At 460, the proximity database is updated with the IP address of the device and the estimated proximity, in the form of an estimated round-trip time.

In some instances, the network zones are sorted based at least in part on the selected weight associated with the device and zone geographic location combination. A default incremental round-trip time is assigned to the sorted network zones to determine the estimated proximity for the device relative to the network zones. For example, it may be determined that with respect to a device in Canada, zone A in Canada is most proximate with a weight of 1, zone B in the United States is next most proximate with a weight of 2, and a zone C in Japan is third most proximate with a weight of 3. The zones would be sorted according to the weights and incrementing round-trip times of 100 milliseconds would be stored as the estimated proximity for zone A, 200 milliseconds for zone B, and 300 milliseconds for zone C.

The device identification information for entries in the IP database may be compared with an ignore list of devices to be ignored. In this case, information is not stored in the proximity database for any devices having identification information in the ignore list.

While FIGS. 3 and 4 illustrate various actions occurring in serial, it is to be appreciated that various actions illustrated in FIGS. 3 and 4 could occur substantially in parallel. By way of illustration, a first process could receive device location data at 310, a second process could determine an estimated proximity at 320, and a third process could store an estimated proximity in a proximity database at 330. While three processes are described, it is to be appreciated that a greater and/or lesser number of processes could be employed and that lightweight processes, regular processes, threads, and other approaches could be employed.

In one example, executable instructions associated with performing a method may embodied as logic encoded in one or more tangible media for execution. When executed, the instructions may perform an encoded method. Thus, in one example, a logic encoded in one or more tangible media may store computer executable instructions that if executed by a machine (e.g., ASIC) cause the machine to perform methods 300 or 400. While executable instructions associated with the above encoded methods are described as being embodied as logic encoded in one or more tangible media, it is to be appreciated that executable instructions associated with other example methods described herein may also be stored on a tangible media.

A "tangible media", as used herein, refers to a medium that stores signals, instructions and/or data. A tangible media may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a tangible medium may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

Figure 5:
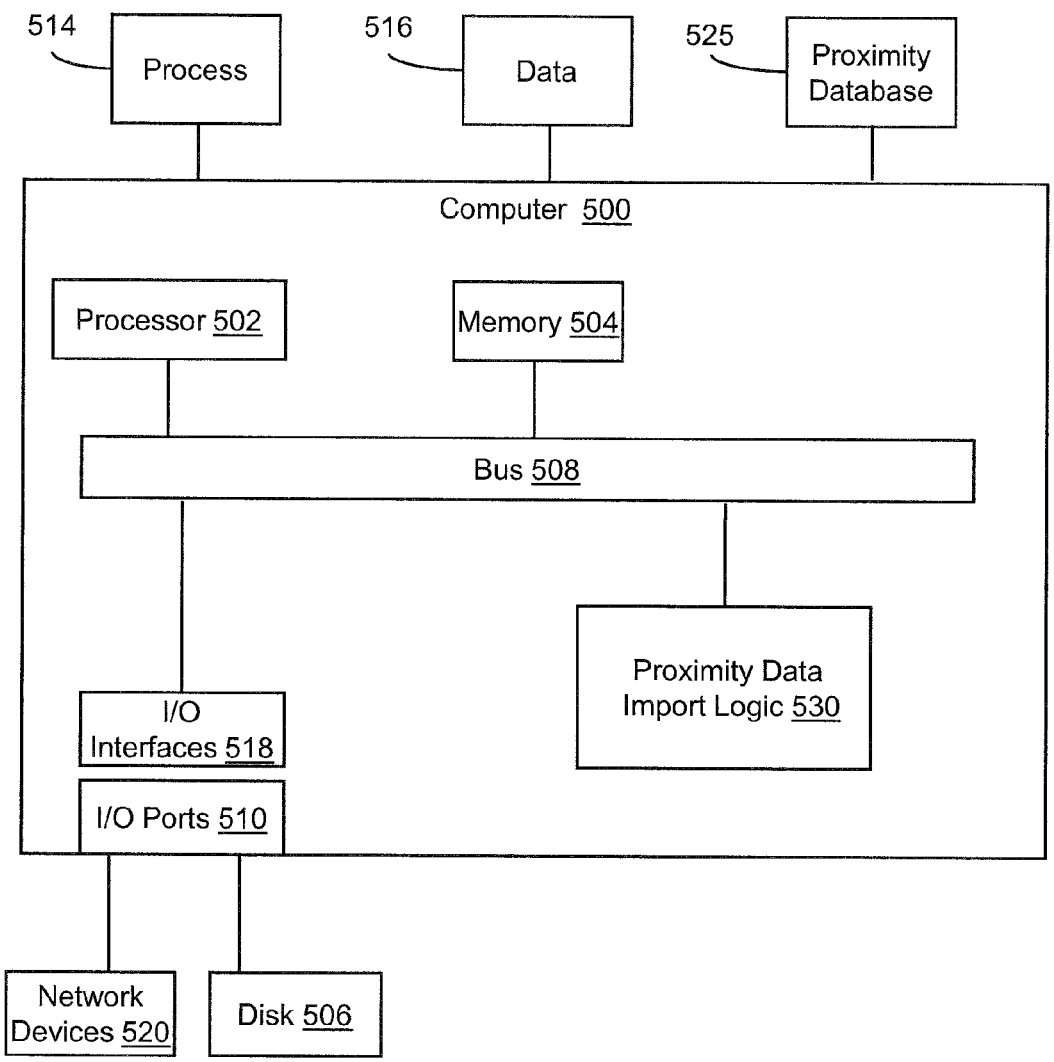
FIG. 5 illustrates an example computing environment in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a proximity data import logic 530 to import location data from an external database and store the location data as proximity data in a proximity database 525. The proximity data import logic 530 may be located in an ASIC. In different examples, the proximity data import logic 530 may be implemented in hardware, a method encoded on a tangible medium, firmware, and/or combinations thereof. While the proximity data import logic 530 is illustrated as a hardware component attached to the bus 508, it is to be appreciated that in one example, the proximity data import logic 530 could be implemented in the processor 502.

Thus, proximity data import logic 530 may provide means (e.g., hardware, firmware) for importing device identification and location information for a network device from a location data source. The means may be implemented, for example, as an ASIC programmed to receive device location information from an external location data source.

Proximity data import logic 530 may also provide means (e.g., hardware, firmware) for determining zone geographic location for one or more network zones. The means may be implemented, for example, as an ASIC programmed to query components in network zones to return the location of the network zone.

Proximity data import logic 530 may also provide means (e.g., hardware, firmware) for determining an estimated proximity for the network device based at least in part on the device location information and the zone geographic location. Logic 530 may also provide means (e.g., hardware, firmware) for storing a device identifier and a corresponding estimated proximity in a proximity database.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, programmable ROM (PROM), and so on. Volatile memory may include, for example, RAM, static RAM (SRAM), dynamic RAM (DRAM), and so on. While a computer 500 is described, the proximity data import logic 530 may appear in a networking device (e.g. a site selector).

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD recordable (CD-R) drive, a CD rewriteable (CD-RW) drive, a digital versatile disk and/or digital video disk ROM (DVD ROM), and so on. The memory 504 can store a process 514 and/or data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., peripheral component interconnect express (PCIE), 1394, universal serial bus (USB), Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. An apparatus, comprising:
    an import logic to receive device identification information and device location information associated with a device from a device location data source;
    a weighting logic to (1) determine estimated proximities of the device to two or more network zones in a network, the estimated proximities being determined based at least in part on the device location information and locations of the two or more network zones, and to (2) apply a default incremental round-trip time to the two or more network zones to determine the estimated proximities for the device relative to the two or more network zones; and
    an update logic to store the device identification information and the determined estimated proximities with respect to the two or more network zones in a proximity database that stores proximity data for devices relative to the two or more network zones.

2. The apparatus of claim 1, where the import logic is configured to parse an IP database entry for a given device to extract a device address and a country code.

3. The apparatus of claim 1, comprising a weighting matrix that maps a weighting factor to a combination of a network zone location and a device location and where the weighting logic determines a location for at least one of the two or more network zones and accesses the weighting matrix to select a weighting factor based on the location of the at least one of the two or more network zones and the device location information.

4. The apparatus of claim 3, where the weighting logic determines a location for the two or more network zones and accesses the weighting matrix to select weights based at least in part on network zone location and the device location information.

5. The apparatus of claim 1, where the weighting logic comprises a query engine to query a Direct Response Protocol Agent for the two or more network zones to return a location for the Direct Response Protocol Agent for the two or more network zones.

6. The apparatus of claim 1, where the weighting logic comprises a round-trip time logic that calculates an estimated round-trip time for the device with respect to the two or more network zones based at least in part on the device location information and a location of the two or more network zones.

7. Logic encoded in one or more tangible media for execution, the logic being operable, when executed, to perform an encoded method, the encoded method comprising:
   receiving device identification information and device location information associated with a device from a data source;
   determining estimated proximities of the device to two or more network zones based at least in part on the device location information;
   applying a default incremental round-trip time to the two or more network zones to determine the estimated proximities for the device relative to the two or more network zones;
   storing a device identifier associated with the device identification information and the estimated proximities of the device in a proximity database that stores proximity data for devices relative to ene two or more network zones.

8. The logic of claim 7, where the receiving is performed by parsing an entry in a database that stores proximity information to extract an IP address and country information for a device.

9. The logic of claim 7, where the estimated proximity is determined by:
   determining a device geographic location of the device from the location information;
   determining a zone geographic location of at least one of the two or more network zones;
   selecting a weight from a weighting matrix that maps a weight to a combination of device geographic location and zone geographic location;
   determining an estimated proximity based at least in part on the selected weight.

10. The logic of claim 9, where the estimated proximity is determined by applying the weight to a default round-trip time between the device geographic location and the zone geographic location.

11. The logic of claim 9, where the encoded method comprises:
   determining a zone geographic location for at least two network zones; and
   selecting a weight from the weighting matrix for the zone geographic locations.

12. The logic of claim 9, where the encoded method comprises:
   querying a network zone matrix to return a list of network zones; and
   sorting the list of network zones based at least in part on weights associated with zone geographic locations for the network zones.

13. The logic of claim 9, where the encoded method comprises determining a zone geographic location of the returned network zones by querying a Direct Response Protocol Agent for the two or more network zones to return a location for the Direct Response Protocol Agent for the two or more network zones.

14. The logic of claim 7, where the encoded method comprises comparing the device identification information with an ignore list of device identification information corresponding to devices to be ignored and where a device identifier is not stored for any devices having identification information in the ignore list.

15. A system, comprising:
   means for importing device identification and location information for a network device from a location data source;
   means for determining zone geographic locations for two or more network zones;
   means for determining estimated proximities for the network device based at least in part on the device location information and the zone geographic locations;
   means for applying a default incremental round-trip time to the two or more network zones to determine the estimated proximities for the device relative to the two or more network zones; and
   means for storing a device identifier and a corresponding estimated proximity of said estimated proximities in a proximity database.

\* \* \* \* \*